United States Patent [19]

Frey et al.

[11] Patent Number: 5,070,766
[45] Date of Patent: Dec. 10, 1991

[54] HYDRAULIC VALVE ACTUATOR

[75] Inventors: Heinz Frey, Menziken; Kamil Prochazka, Windisch, both of Switzerland

[73] Assignee: Asea Brown Boveri Ltd., Baden, Switzerland

[21] Appl. No.: 557,786

[22] Filed: Jul. 26, 1990

[30] Foreign Application Priority Data

Sep. 1, 1989 [CH] Switzerland ............... 3180/89-1

[51] Int. Cl.$^5$ ............................................. F01B 31/00
[52] U.S. Cl. ....................................... 92/107; 92/109; 92/130 R; 92/130 C
[58] Field of Search ............... 92/80, 81, 107, 108, 92/110, 130 R, 130 A, 130 C, 142, 86, 8; 251/61.5, 63.6; 91/51, 165, 415

[56] References Cited

U.S. PATENT DOCUMENTS

| 2,976,845 | 3/1961 | Goldring | 92/80 |
| 3,331,291 | 7/1967 | Seablom | 92/108 |
| 3,379,405 | 4/1968 | Natho . | |
| 3,726,187 | 4/1973 | Lewis | 92/108 |
| 3,741,075 | 6/1973 | Moseley et al. | 92/86 |
| 4,103,864 | 8/1978 | Hagendorn | 251/63.6 |
| 4,585,207 | 4/1986 | Shelton | 251/63.6 |
| 4,601,456 | 7/1986 | Austin et al. . | |
| 4,744,386 | 5/1988 | Frazer . | |
| 4,877,217 | 10/1989 | Peil et al. | 91/415 |

FOREIGN PATENT DOCUMENTS

| 0149908 | 7/1985 | European Pat. Off. . | |
| 2558959 | 5/1977 | Fed. Rep. of Germany | 251/63.6 |
| 0357251 | 11/1961 | Switzerland | 251/63.6 |
| 651900 | 10/1985 | Switzerland . | |
| 0721731 | 1/1955 | United Kingdom | 251/63.6 |

*Primary Examiner*—John T. Kwon
*Assistant Examiner*—Thomas Denion
*Attorney, Agent, or Firm*—Burns, Doane, Swecker & Mathis

[57] ABSTRACT

This hydraulic actuator has a drive volume (11) pressurized by extreme-pressure oil. The oil pressure is converted into a valve movement by a drive piston (10). A spring element acts upon the drive piston (10) in a manner opposing the oil pressure. The actuator is to be constructed such that extreme-pressure oil escaping from the drive volume (11) cannot cause any consequential damage. This is achieved in that the drive volume (11) is completely surrounded by a safety volume (3, 7) filled with low-pressure oil.

5 Claims, 1 Drawing Sheet

HYDRAULIC VALVE ACTUATOR

BACKGROUND OF THE INVENTION

1. Field of the Invention

The invention proceeds from a hydraulic actuator for actuating a valve. The actuator has a drive volume that is pressurized by extreme-pressure oil and is bounded by a drive piston. A spring element acts upon the drive piston in a manner opposing the extreme-pressure oil.

2. Discussion of Background

Hydraulic actuators for actuating valves in power stations are known such as are actuated by extreme-pressure oil and which are moved back once again into the initial position by an in-built spring element when the pressure of the extreme-pressure oil decreases or when the extreme-pressure oil is pumped off. As a rule, in this regard the drive volume and the spring element are arranged behind one another in the actuator on a common axis. This model requires a relatively large amount of space in the axial direction. In addition, the drive volume adjoins the ambient air at least on one side, so that in the event of seal damage extreme-pressure oil can escape from the drive volume and endanger the environment. Thus, for example, fires can be started by extreme-pressure oil spraying onto hot parts.

SUMMARY OF THE INVENTION

Accordingly, one object of this invention is to provide a novel remedy here. As specified in the claims, the invention achieves the object of providing a hydraulic actuator in which extreme-pressure oil escaping from the drive volume cannot cause consequential damage.

The advantages achieved by the invention are essentially to be seen in that the hydraulic actuator can be operated more safely. Additional shields, which can provide protection against extreme-pressure oil that may escape are not required here. The hydraulic actuator can be built in a comparatively compact fashion, and this has a positive effect on its economic operation.

The further embodiments of the invention are the subject of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
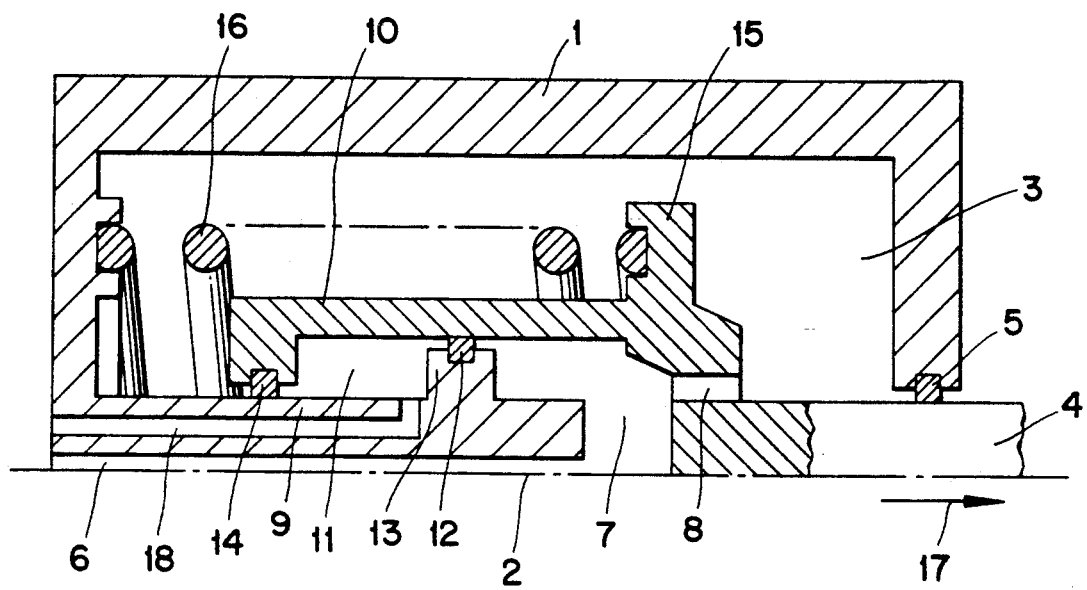
FIG. 1 is a cross-sectional view of a first embodiment according to the present invention.

Referring now to FIG. 1, the figure represents a sketch of the principle of a hydraulic actuator according to the invention. Its necessarily existent fastening elements are not represented, nor likewise are the hydraulic feed lines or any electrohydraulic actuating elements for the actuator, such as, for example, proportional valves. Furthermore, the lift monitoring of the actuator, which is normally present, is likewise not represented. A casing 1 seals the hydraulic actuator from the outside. This casing 1 is constructed in an essentially cylindrical fashion to extend along a longitudinal axis 2, and has an interior 3 filled with a low-pressure oil. On its right-hand side, the casing 1 is penetrated by a valve stem. 4. A seal 5 seals the interior 3 off from the environment. A central bore 6, through which the low-pressure oil is admitted and discharged, leads into the casing 1 on the left-hand side. The bore 6 leads into an intermediate volume 7 which is connected to the interior 3 through an opening 8.

The bore 6 has a wall 9, whose side facing the interior 3 serves as a guide for a drive piston 10 and, at the same time, as a wall of a drive volume 11. A shoulder 13 mounted on the wall 9 and provided with a seal 12 seals the drive volume 11 off from the intermediate volume 7 and, at the same time, guides the drive piston 10. The drive piston 10 is provided with a seal, which seals the drive volume 11 off from the interior 3. The drive piston 10 is connected via a spring plate 15 to the valve stem 4; the separation sites of this subassembly are not represented. The spring plate 15 extends into the interior 3. It has a receptor for a spiral spring 16, of which the other end is supported against the left-hand side of the casing 1. The spiral spring 16 tends to press the spring plate 15 to the right in the direction of an arrow 17. The drive volume 11 is situated in the region inside the spiral spring 16; the longitudinal axis 2 represents the central axis for both elements. The drive volume is pressurized by extreme-pressure oil via at least one duct 18 let into the wall 9.

The figure may be considered in more detail for the purpose of explaining the mode of operation. In the state of rest, when no significant pressure pressurizes the drive volume 11, the spiral spring 16 pushes the valve stem 4 to the right in the direction of the arrow 17. The valve pressurized via this valve stem 4 is then closed. This position can also be designated as failsafe position. If the drive volume 11 is pressurized by extreme-pressure oil, the drive piston 10 moves to the left in common with the valve stem 4, and the valve is opened. The extreme-pressure oil has a pressure in the region of 100 to 200 bar. The lift of the actuator is regulated by the amount of the extreme-pressure oil admitted. The seals 12 and 14, which seal off the drive volume 11 from the neighboring volumes, which are filled with low-pressure oil and serve as safety volume, to be precise from the intermediate volume 7 and the interior 3, are highly pressurized, so that a failure of these seals 12 and 14 can never be entirely ruled out.

However, here such a failure does not cause any consequential damage, since the extreme-pressure oil escaping from the drive volume 11 is captured in the safety volume. The pressure of the low-pressure oil in the safety volume, which is normally 5 bar, for example, is raised to a maximum of 7 to 8 bar by the added extreme-pressure oil. The dimensions of the sealing gaps, through which the extreme-pressure oil escapes in the event of failure, limit this oil flow, so that too high a pressure cannot occur in the safety volume. In addition, the safety volume is constructed larger than the drive volume 11, so that here, too, a certain redundant safety is built in. The safety volume is constructed approximately ten to fifty times larger than the drive volume 11, so that pressure surges caused by escaping extreme-pressure oil are very reliably flattened to safe values. Extreme-pressure oil flowing afterwards is likewise unable to cause any impermissible pressure rise in the safety volume, since the lines for the low-pressure oil that are connected to the bore 6 have a cross-section large enough to be able to discharge possible pressure rises.

Figure 2:
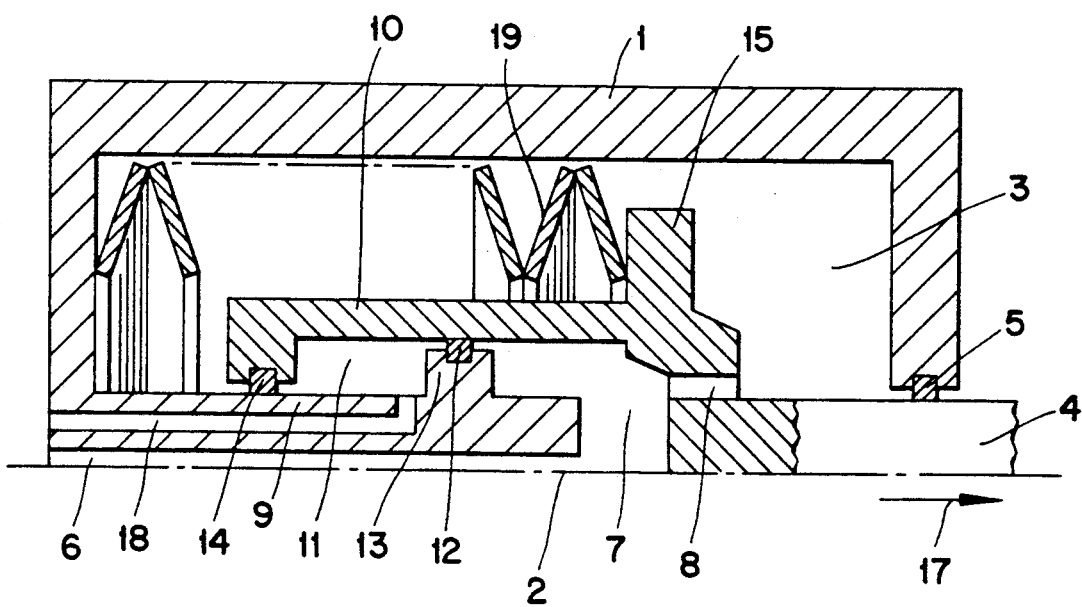
FIG. 2 is a cross-sectional view of a second embodiment according to the present invention.

The concentric arrangement of the drive volume 11 inside the spiral spring 16 renders possible a close-knit and compact design of the actuator. The existing safety volume can advantageously also be used simultaneously as a space for the spiral spring 16. Depending upon what is required, it is also possible for disk springs 19 that are laminated as a bank to be used instead of the spiral spring 16 as shown in FIG. 2. Moreover, a combination of disk springs with spiral springs is also possible, so that the spring characteristic can be matched to the operational requirements of the actuator.

With this actuator, it is not possible for extreme-pressure oil to gain access to the ambient atmosphere if a seal defect should occur. In this way, consequential damage such as fires, injuries and pollution of the installation are avoided. The operational safety of such an actuator is substantially increased. Moreover, it is possible for the actuator to be advantageously built in a compact fashion, and this enhances its economic operation.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. A hydraulic actuator for actuating a valve, comprising a drive volume pressurized by extreme-pressure oil and bounded by a drive piston, and comprising a spring element acting upon the drive piston in a manner opposing the extreme-pressure oil, wherein the drive volume is completely surrounded by a safety volume filled with low-pressure oil.

2. The hydraulic actuator as claimed in claim 1, wherein the drive volume and the spring element are arranged concentrically, the spring element concentrically surrounding the drive volume.

3. The hydraulic actuator as claimed in claim 1, wherein at least one of a disk spring bank and a spiral spring is provided as the spring element.

4. The hydraulic actuator as claimed in claim 1, wherein the safety volume is constructed larger than the drive volume.

5. The hydraulic actuator as claimed in claim 4, wherein the safety volume is constructed ten to fifty times larger than the maximum drive volume.

* * * * *